United States Patent [19]

Balmer

[11] Patent Number: 5,562,540
[45] Date of Patent: Oct. 8, 1996

[54] APPARATUS FOR COMBINED THRESHING AND SEPARATING OF SEEDS FROM A SEED CROP

[76] Inventor: Charles Balmer, Box 34, Elie, Manitoba, Canada, R0H 0H0

[21] Appl. No.: 489,510

[22] Filed: Jun. 12, 1995

[51] Int. Cl.$^6$ .......................... A01F 12/18; A01F 12/395
[52] U.S. Cl. .................. 460/65; 460/68; 460/99
[58] Field of Search .................. 460/68, 65, 67, 460/66, 80, 99, 100; 56/126

[56] References Cited

U.S. PATENT DOCUMENTS

| | | |
|---|---|---|
| 1,907,035 | 5/1933 | Baldwin . |
| 1,911,665 | 5/1933 | Baldwin . |
| 1,949,774 | 4/1934 | Baldwin . |
| 2,906,270 | 9/1959 | Buchele . |
| 2,974,668 | 3/1961 | Witzel ........................................ 460/65 |
| 4,198,802 | 4/1980 | Hengen et al. ...................... 460/67 X |
| 4,904,224 | 2/1990 | Pohjala ................................. 460/65 X |

OTHER PUBLICATIONS

Transactions of the ASAE—1963—W. F. Lalor/W. R. Buchele (4 pages).
Transactions of the ASAE—1964—J. C. Buchanan/W. H. Johnson (5 pages).

*Primary Examiner*—Terry Lee Melius
*Attorney, Agent, or Firm*—Adrian D. Battison; Murray E. Thrift

[57] ABSTRACT

A threshing and separating apparatus particularly for use in a combine harvester includes a threshing rotor having a generally conical outer surface cooperating with a generally conical inner surface of a stator so that crop material fed to the narrower end of the rotor moves between the surfaces to provide a threshing action. At the discharge end of the annular channel between the rotor and stator is provided a separating sleeve which is rotated around the rotor separately from the rotor and stator. The sleeve is perforated to allow radial escape of seeds under a centrifugal force and a fan generates an air flow entering the sleeve from the feed end and pulled out of the sleeve from the discharge end so that lighter materials such as chaff are drawn through the space of the discharge end while the seeds escape outwardly.

20 Claims, 4 Drawing Sheets

APPARATUS FOR COMBINED THRESHING AND SEPARATING OF SEEDS FROM A SEED

BACKGROUND OF THE INVENTION

This invention relates to an apparatus for combined threshing and separating of seeds from a seed crop of the type which includes a rotor mounted for rotation about an axis with a stator surrounding the rotor and defining therewith an annular channel between an outside surface of the rotor and an inside surface of the stator, means for feeding the crop material into an inlet end at one end of the annular channel for movement between the rotor and the stator to a discharge end axially opposed to the inlet end and means for separating the seeds from the crop material at the discharge end of the annular channel.

Work on an arrangement of this type was carried out in the late 1920s by Curtis Baldwin. He discloses a number of arrangements in his U.S. Pat. Nos. 1,907,035 issued in 1933, 1,911,665 also issued in 1933 and 1,949,774 issued in 1934.

Each of these patents discloses a rotor which is generally conical so as to diverge outwardly or increase in diameter from an inlet end towards an outlet end. A stator surrounds the rotor and has a similar shape so as to define an annular channel there between which also increases in diameter towards the discharge end. An auger feeds the crop material longitudinally of the axis from a feeding system forwardly of the rotor toward an inlet end of the annular channel so that the crop material is injected into the annular channel at the feed end of the rotor and moves with the rotor axially and outwardly from the axis through the annular channel to the discharge end. The rotor and stator carry rasping bars so that the threshing action occurs between the rotor and the stator acting to thresh the seeds out of their connection to the remainder of the crop material.

Downstream of the discharge end of the annular channel, Baldwin proposed an arrangement for separation of the seeds from the remainder of the crop material after the threshing has occurred in the rotor and stator arrangement by a fan which is connected to the rotor and rotates with the rotor so as to draw air radially inwardly against the centrifugal action on the seeds. The fan thus pulls air inwardly toward the axis and longitudinally of the axis away from the discharge end of the annular channel to carry the lighter crop material along the axis to the fan for discharge radially outwardly of the fan while allowing the seeds under the centrifugal force caused by the rotation of the rotor to move outwardly away from the axis against the air movement for collection at a bottom of a housing surrounding the discharge end of the rotor.

However the separation of the seeds from the crop material using simply air flow and the forces generated by the centrifugal action of the rotor is believed to be unsatisfactory leading to the possibility of significant losses of seed in the crop material carried through the fan. The Baldwin threshing machine therefore apparently achieved little success at the time and was unable to displace the conventional arrangement of the combine harvester which has become widely adopted and widely used up till the present time.

The conventional combine harvester utilizes a threshing cylinder mounted with its axis transverse to the direction of feed to the crop material and a concave surrounding a part of the cylinder so that the crop material engages the cylinder and is fed between the outside surface of the cylinder and the concave so that the seeds are discharged away from the cylinder and the remainder of the crop material is carried rearwardly with the cylinder for discharge onto the straw walkers. The cylinder and concave arrangement therefore carries out all of the threshing action and some of the separating action with the remainder of the separating action being effected at the straw walkers. This arrangement has a number of significant disadvantages in that it is relatively complex and in that it is highly susceptible to tilting of the system relative to a nominal horizontal position of the combine harvester.

An alternative technique for the combine harvester comprises the rotary combine in which the cylinder is rotated through 90° so that its axis is longitudinal of the direction of crop movement and the cylinder is increased in length so as to have an increased threshing action. This obviates the necessity for straw walkers so that the threshing and separating action occurs wholly at the rotary cylinder. The rotary combine has achieved some success in recent years but is becoming less popular due to some perceived inefficiencies in some crops.

It has been generally appreciated that both of these combine harvester techniques have a number of disadvantages and could be significantly improved.

Some further work in this area has been carried out by Lagergren and Underwood which is shown in a brief article describing their machine although searches have revealed no patents disclosing details.

Also some research has been done into techniques for threshing and separating using rotating cones.

In one research paper published in 1963 in Transactions of the ASAE, Lalor and Buchele disclose and test an arrangement similar to that of Baldwin using a rotating conical rotor surrounded by a stationary conical cylinder. The separation of the seeds from the crop material also occurred in the annular channel between the rotor and the stator with the seeds passing through perforations in the conical stator.

This arrangement is shown in more detail in U.S. Pat. No. 2,906,270 of Buchele apparently but has not led to any commercial products.

Further research was carried out and published in 1964 in transactions of the ASAE by Buchanan and Johnson. This related to an attempt to effect threshing and separation on the inside of a rotating cone. The crop material was fed into the apex or narrower end of the cone and moved axially and outwardly due to the rotation of the cone with the seeds passing through holes in the cone and the remaining crop material passing along the cone for discharge at the larger open end. The paper appears to relate solely to a research evaluation and did not apparently lead to any commercial equipment.

SUMMARY OF THE INVENTION

It is one object of the present invention, therefore, to provide an improved threshing and separating apparatus of the above general type which provides for improved separation of the seeds from the remaining crop material in a construction which is of simplified mechanical structure relative to the conventional combine harvester.

According to one aspect of the invention there is provided a combined threshing and separating apparatus for separating seeds from a seed crop comprising: a threshing rotor, means mounting the threshing rotor for rotation about a longitudinal axis of the threshing rotor, the threshing rotor having an outer threshing surface surrounding the axis which extends from a feed end in a direction longitudinally of the axis to a discharge end; a threshing stator surrounding the rotor and having an inner surface adjacent the outer threshing surface of the rotor; the inner and outer surfaces being arranged to define therebetween an annular channel having a feed end of the annular channel at the feed end of the rotor and a discharge end of the annular channel at the discharge end of the rotor; means for feeding the crop material to the feed end of the annular channel, the inner and outer surfaces being shaped to effect a threshing action on the crop material as it passes therebetween; a separating sleeve member defining an inwardly facing separating surface surrounding said axis with an inlet end and an axially spaced discharge end, means mounting the sleeve member for rotation around the axis, the inlet end of the sleeve member being arranged at the discharge end of the annular channel to receive therefrom onto the separating surface of the sleeve member the crop material after threshing in the annular channel; the separating surface of the sleeve member having a plurality of separating perforations therein such that seeds from the crop material escape from the separating surface outwardly for collection; drive means for rotating the sleeve member about the axis to generate centrifugal forces on the crop material on the separating surface; and fan means for generating an airflow through the discharge end of the sleeve member for drawing air and crop material entrained by the air through the sleeve member for discharge of the crop material separately from the seeds.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
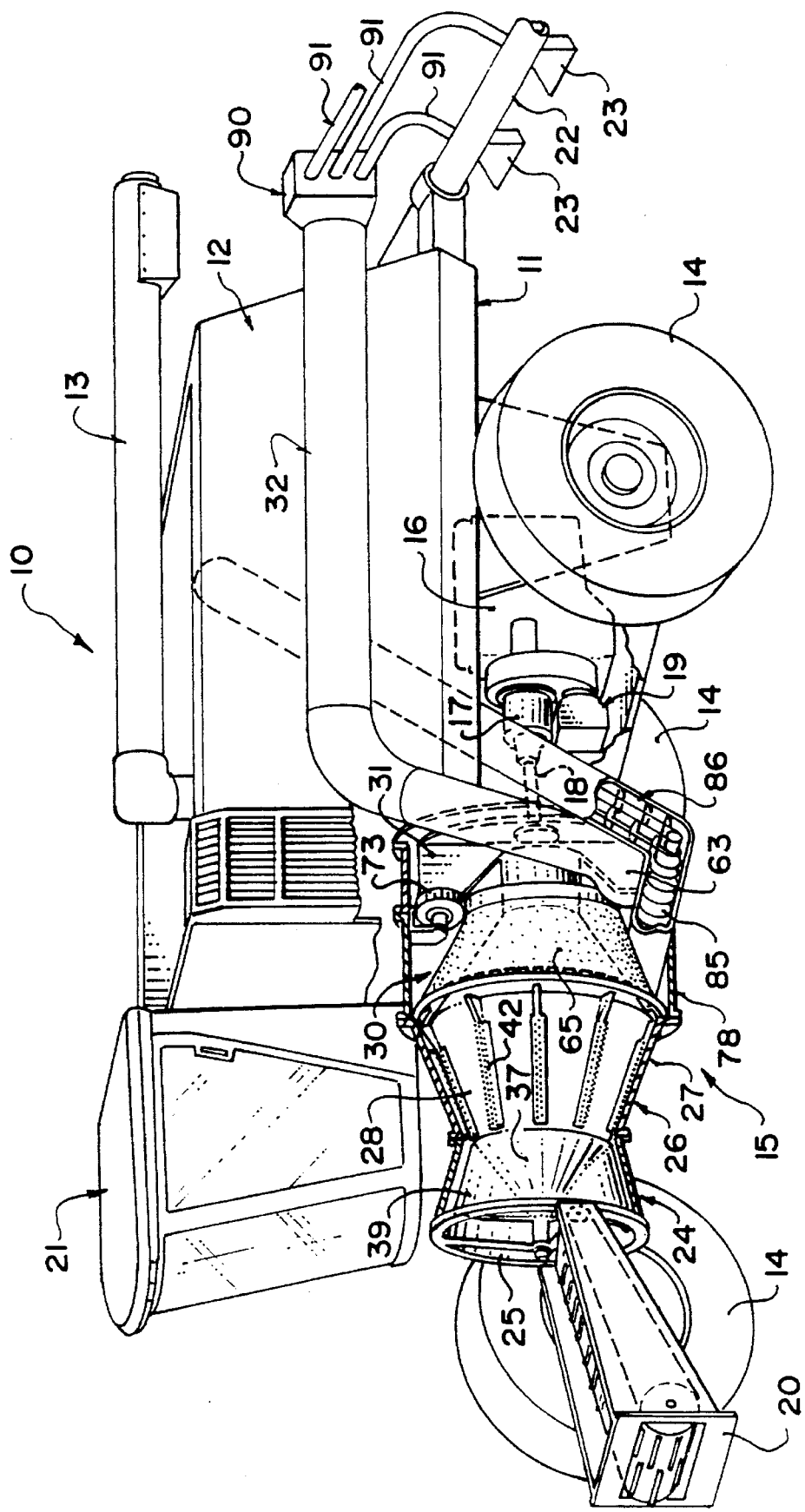
FIG. 1 is an isometric view partly broken away showing a combine harvester including apparatus for threshing and separating seeds from a seed crop according to the present invention.
Figure 2:
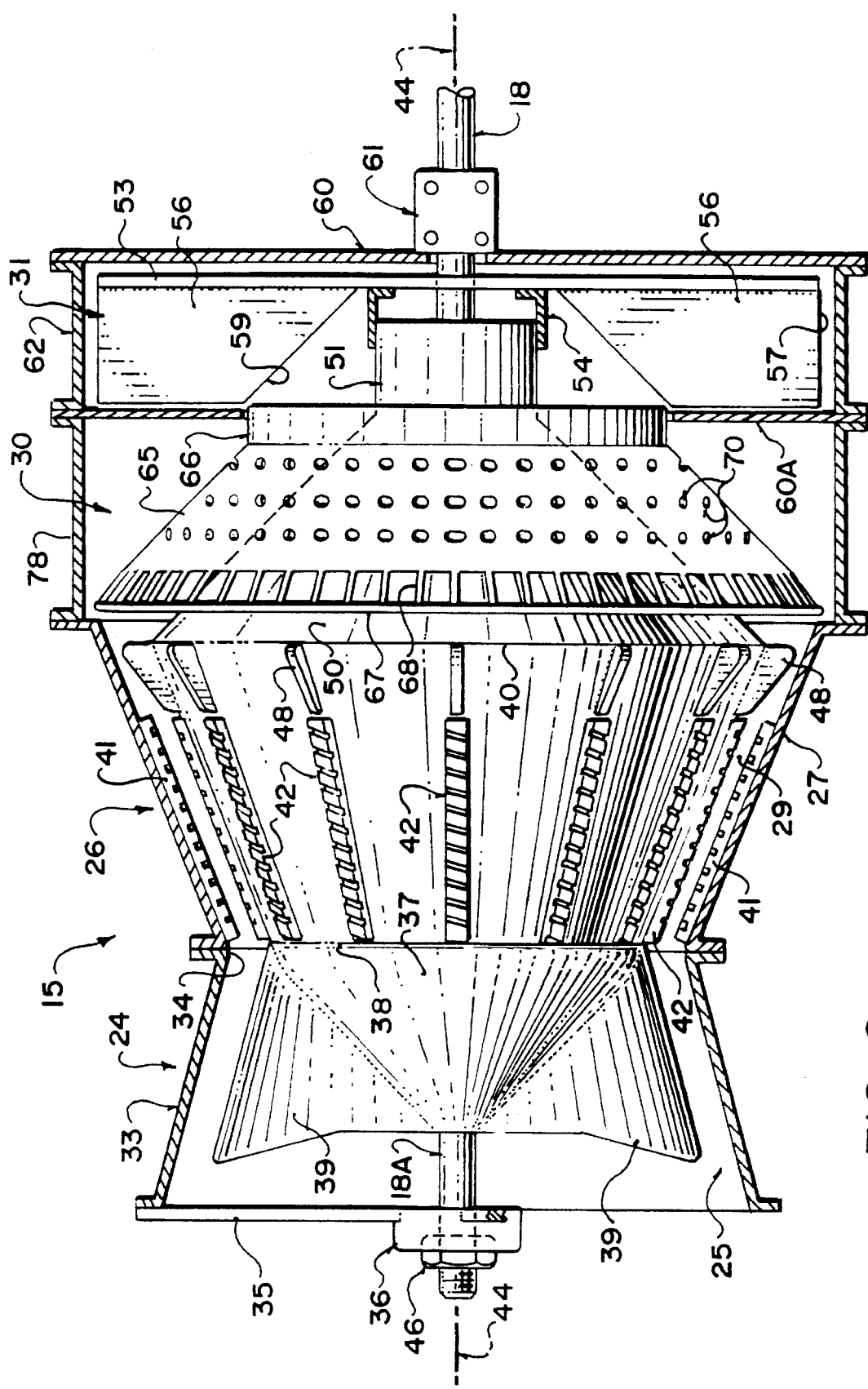
FIG. 2 is a vertical sectional view through the threshing and separating apparatus of FIG.1 showing the outer housing in cross section and the inner rotor and sleeve member in side elevational view.
Figure 3:
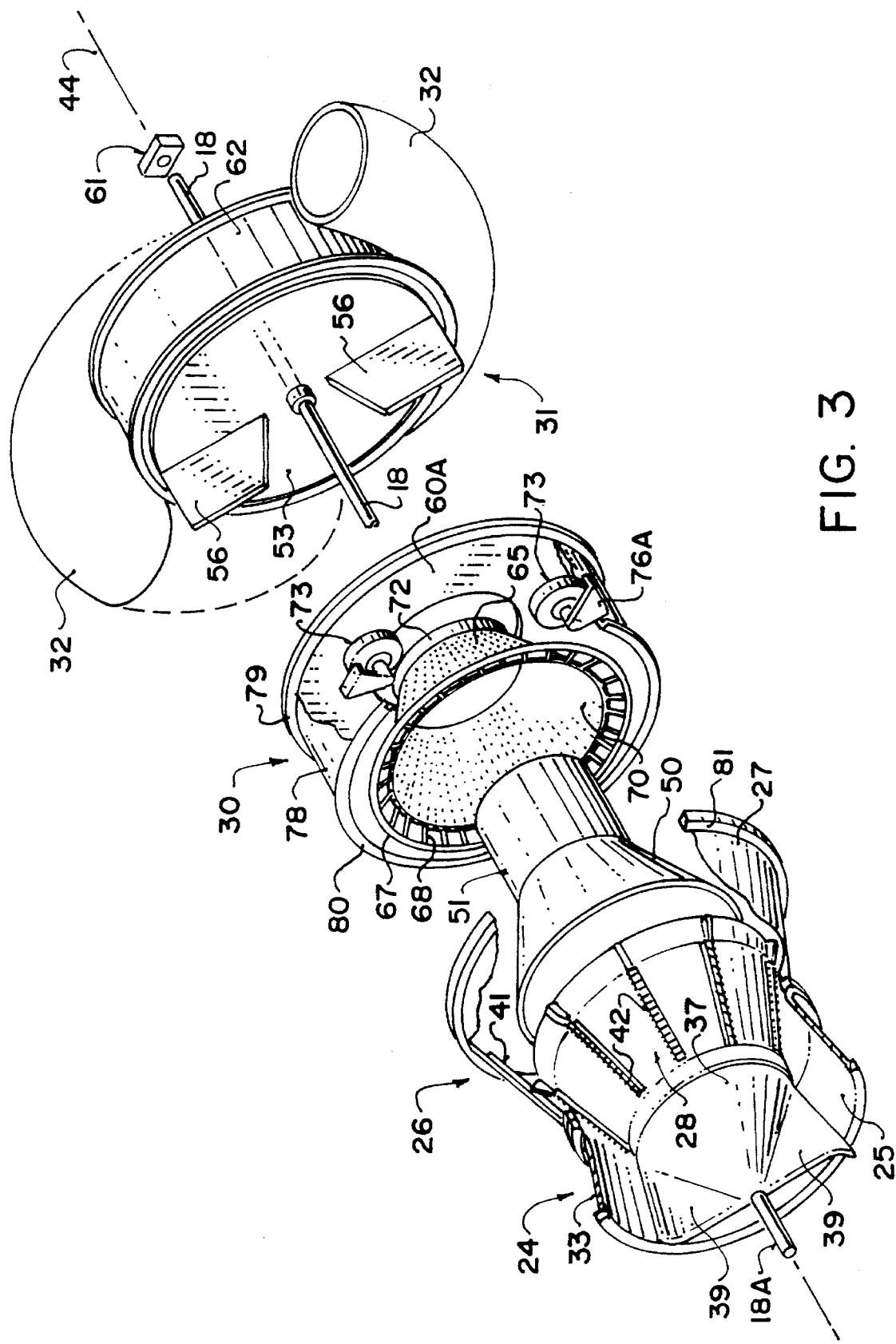
FIG. 3 is an exploded view of the apparatus of FIGS. 1 and 2 showing the outer housing partly broken away.
Figure 4:
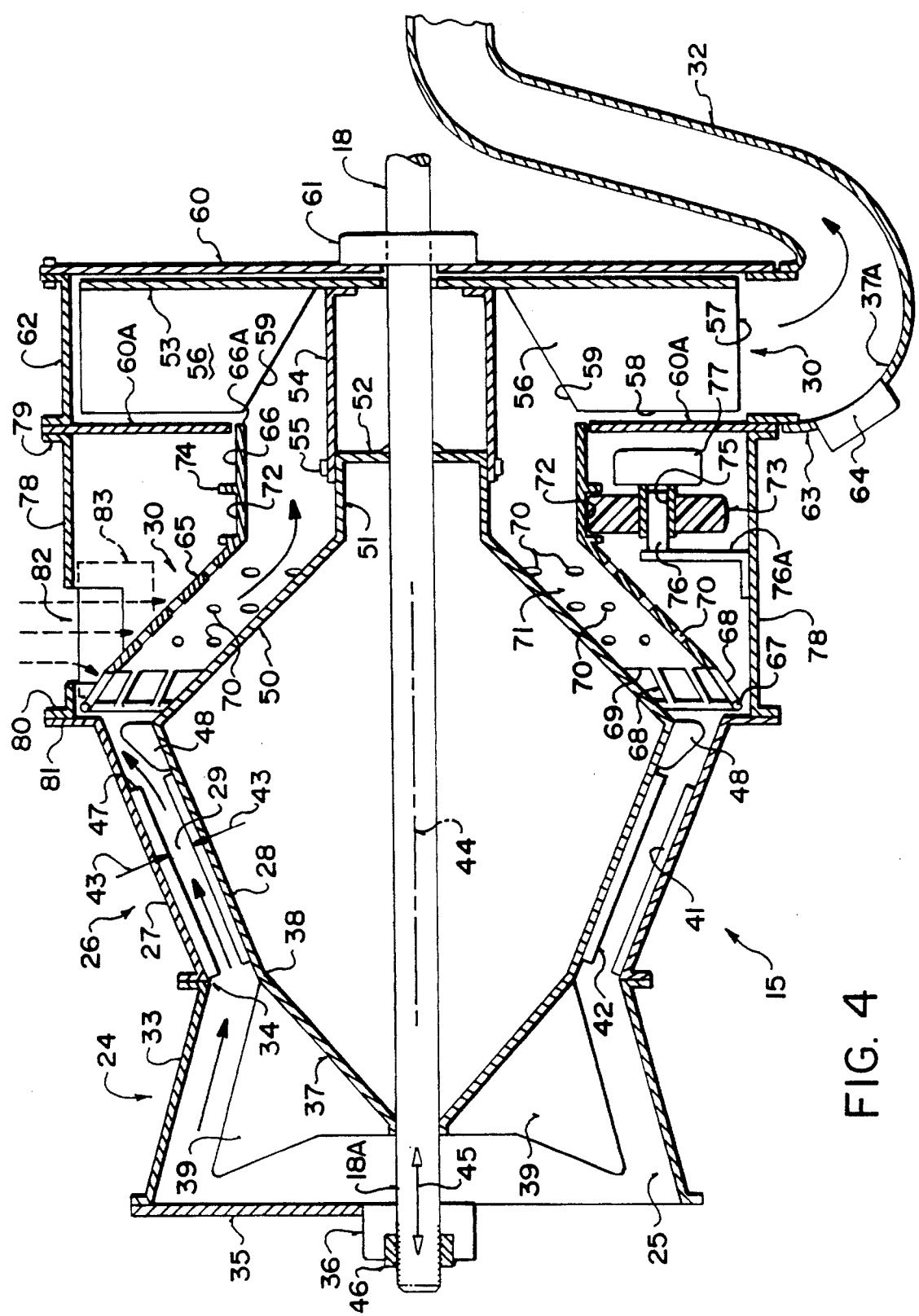
FIG. 4 is a horizontal cross sectional view through the apparatus of FIGS. 1, 2 and 3.

A combine harvester including a threshing and separating apparatus according to the present invention is indicated generally at 10 and includes a frame 11 carrying a grain storage tank 12 with a discharge boom 13 for discharging the grain from the tank 12 into a transport vehicle. The frame 11 is mounted on four ground wheels 14, one of which is removed for convenience of illustration to allow the break away of the drawings showing in more detail the separating and threshing apparatus generally indicated at 15. An engine 16 is slung under the frame 11 between the rear wheels and drives an output shaft 17 for directly driving an input shaft 18 of the apparatus 15. The engine 16 further drives a hydraulic pump 19 which generates fluid pressure for driving a part of the apparatus 15 as described hereinafter, for driving the ground wheels 14 and for driving other elements of the combine harvester of a conventional nature. The machine further includes a feeder housing 20 connected to a pickup or header (not shown) for receiving and transporting crop into the apparatus 15. The machine further includes a cab 21 positioned directly above the apparatus 15 and forwardly of the tank 12 so that the operator has ready vision of the operation of the combine harvester in front of the feeder housing 20 and the pickup (not shown). The machine further includes a boom 22 which is mounted on the rear of the frame 11 and extends outwardly to each side of the machine. The boom is shown only schematically but will of course include a folding system allowing the two sides of the boom to fold into a retracted position for transportation. The boom includes a number of sprayer nozzles 23 at spaced positions along the length of the boom as described in more detail hereinafter.

Turning now to the construction of the threshing and separation apparatus 15, this comprises an intake section generally indicated at 24 having an open mouth 25 through which crop is fed from the feeder housing 20. The apparatus further includes a threshing section 26 including a stator 27 and a rotor 28 defining there between an annular channel 29 through which the crop passes from the feed section 24. Downstream of the annular channel 29 is provided a sleeve member 30 which acts to separate the seeds from the seed crop after threshing between the rotor and stator. Downstream of the sleeve member 30 is provided a fan 31 which acts to draw air in through the sleeve member and to drive that air radially outwardly into a discharge duct 32.

The intake section 25 includes a housing 33 which converges inwardly and rearwardly and generally is frustoconical in shape from the open mouth 25 to a discharge opening 34 at a rear of the housing 33 which discharge opening communicates with the annular channel 29. The housing 33 carries a spider 35 which supports a bearing 36 centrally of the circular open mouth 25 for supporting a shaft portion 18A of the shaft 18.

Inside the housing 33 is mounted a conical feed surface 37 which is welded to the shaft 18 at its apex and diverges outwardly and rearwardly therefrom to a front edge 38 of the rotor 28. On the outside of the conical input section 37 is provided a plurality of helical fins 39 which are welded onto the outer face of the conical input section 37 and act in the form of fan blades to drive the crop material from the feeder housing inwardly and rearwardly to the rotor 28.

The rotor 28 comprises a frusto-conical wall which extends from the front edge 38 at the rear of the input section 37 to a rear edge 40 thus defining a conical peripheral surface of the rotor. The rotor 28 cooperates with the stator 27 which comprises a sleeve of similar frusto conical shape thus defining the annular channel which is of substantially constant width from the front edge 38 to the rear edge 40 of the rotor. The stator 27 is fixed so that it does not rotate with the rotor but instead is bolted to the housing 33 of the intake section. The stator carries rasp bars 41 attached to the inside surface of the stator and extending longitudinally of the stator. The rotor similarly carries rasp bars 42 which are similarly longitudinal and thus pass over the rasp bars leaving a shallow clearance 43 between the rasp bars as they pass one another caused by the rotation of the rotor about the axis 44 of the shaft 18. The spacing between the rasp bars 41 and 42 can be adjusted by movement of the shaft 18 axially as indicated at 45 without movement being adjusted by a suitable adjustment mechanism 46 at the bearing 36.

The rasp bars 41 and 42 commence at the front edge 38 of the rotor and extend therefrom to a rear end 47 of the rasp bars spaced forwardly from the rear edge 40 of the rotor. Behind the rasp bars 42 is provided a plurality of radially extending fins 48 mounted on the rotor and arranged at a slight angle relative to the longitudinal direction so as to generate a fan action assisting the movement of the crop material and the air longitudinally of the annular channel 29 to the rear end 40 of the rotor.

At the rear end 40 of the rotor there is provided a support and guide member 50 in the form of a frusto-conical wall which is welded to the rotor at the rear edge 40 and tapers rearwardly and inwardly therefrom to a cylindrical section 51 surrounding the shaft 18. At the rear end of the cylindrical section 51 is provided an annular end wall 52 surrounding the shaft 18 and welded to the shaft 18. Thus the input section 37, the rotor 28 and the rear support section 50 including the end plate 52 together form a solid body surrounding the shaft 18 and attached to the shaft 18 for common rotation therewith.

The fan 31 includes an end plate 53 which is attached to the cylindrical portion 51 by a cylindrical portion 54. The fan is thus attached to the rotor for common rotation therewith. The cylindrical portion 54 is bolted to the cylindrical portion 51 by bolts 55 which allow the fan to be separated from the rotor for disassembly of the apparatus for repair or for cleaning. The end plate 53 carries a plurality of fan blades 56 arranged in an axial plane and projecting forwardly from the end plate toward the rotor. Each blade 56 has an outer edge 57 at the edge of the end plate, a forward edge 58 parallel to the end plate and an inner edge 59 which extends from the forward edge 58 rearwardly and inwardly. The fan further includes an end wall 60 parallel to the end plate 53. The end plate 60 carries bearings 61 for the shaft 18 so that the shaft is held in fixed positions by the bearings 36 and 61 for rotation about the axis 44. The fan further includes a cylindrical housing wall 62 closely surrounding the locus of movement of the outer edge 57 of the fan blades with the housing wall 62 being bolted to the end plate 60. One part of the outer wall 62 includes a discharge duct portion 63 which connects to the ducts 32 for allowing the radial discharge of the air from the fan. The fan housing further includes a front wall 60A which is annular and extends inwardly from a forward end of the peripheral wall 62 in a plane parallel to the rear plate 60.

Air is thus drawn into the fan at the inner edge of the blades inwardly of the wall 60A and is propelled radially outwardly between the walls 60 and 60A by the rotation of the fan. As previously described the duct 32 is curved from its initial generally radial direction rearwardly and inwardly to define an outer wall portion 32A. On this outer wall portion there is provided a collection system 64 which can be used to extract any remaining seeds which are carried through to the fan in the crop material using the centrifugal forces generated by the bend in the duct 32 and the high velocity of the air and material movement as it is expelled from the fan.

The sleeve member 30 comprises a conical wall portion 65 and a cylindrical wall portion 66 connected at the rear end of the conical portion 65. The conical portion 65 commences at a ring 67 which defines a forward outermost edge of the conical wall portion 65. Connected to the ring and extending axially therefrom in the plane of the conical wall portion is a plurality of fingers 68 which bridge a space between the ring 67 and a forward most edge 69 of a sheet of metal defining the conical wall portion 65. The metal sheet is formed with a plurality of perforations 70 punched through the sheet metal to allow penetration of air through the sheet metal in an inward direction into the inside of the sleeve member and to allow the escape of seeds radially outwardly through the perforations. The perforations 70 are elongated in an angular direction.

The ring 67 has a diameter greater than that of the rear most end of the stator 27 so that any crop material passing along the annular channel 29 and inwardly of the stator 27 escapes from the end of the stator 27 and is caught on the inside surface of the sleeve member 30. The inside surface of the sleeve member as indicated at 71 thus forms a separating surface over which the crop material passes in its movement from the annular channel to the fan. The separating surface is thus defined by the finger 68 and the spaces therebetween and by the smooth inner surface of the metal sheet with the perforations therein. The cylindrical portion 66 has a forward end attached to the rearward end of the conical portion and extends therefrom to a trailing edge 66A closely adjacent the interconnection between the forward edge 58 and the inner edge 59 of the fan blades. The conical portion 65 has a cone angle similar to or as the same as the cone angle of the rear support section 50 of the rotor. This defines therefore a channel surrounding the rotor and inwardly of the sleeve member through which air is drawn along the sleeve member to the fan. Similarly the cylindrical portion 66 of the sleeve member surrounds the cylindrical portion 51 of the rotor and thus defines again a channel along which the air is drawn. The projection of the rear support section 50 and the cylindrical portion 51 into the sleeve member thus reduces the volume inside the sleeve member through which the air can pass and thus increases the velocity of air moving in this channel.

The cylindrical portion 66 defines a guide channel 72 for a plurality of support rollers 73 which support the sleeve member for rotation about the axis 44. The sleeve member is thus physically separated from the rotor and from the surrounding housing and is carried for rotation about the axis on the rollers. The guide channel 72 can include side walls 74 which locate the rollers 73 in the guide channel and thus prevent twisting of the longitudinal axis of the sleeve member relative to the axis 44. Each of the rollers 73 has a hub 75 mounted on a support shaft 76 carried on a bracket 76A so that the rollers are held in fixed position surrounding the axis 44 to hold the sleeve member in its fixed position for rotation about the axis 44. The rollers may include a rubber tire and be mounted on suitable bearings (not shown) for smooth high speed rotation of the sleeve member. At least one of the hubs 75 is driven by a hydraulic motor 77 so that the sleeve member is driven in its rotation by frictional engagement with one of the rollers. The sleeve member is surrounded by a cylindrical housing section 78 co-extensive with the peripheral wall 62 surrounding the fan. The housing wall 78 extends from a coupling flange 79 at the peripheral wall 62 to a second flange 80 at the rear end of the stator 27. The stator 27 includes a flange 81 surrounding the rear end of the stator 27 and extending radially outwardly therefrom so as to support the cylindrical housing wall 78 at a position spaced radially outwardly from the rear end of the stator 27 by sufficient distance to receive inside the housing wall 78 the ring 67 of the sleeve member 30. The housing wall 78 has one or more openings 82 for allowing air to enter the housing for passage through the spaces between the fingers 68 and through the perforations 70 toward the fan. The openings 82 can be adjusted by movement of a door 83 mounted in sliding movement on the outside surface of the housing for rotation around the axis 44. The amount of air thus entering the sleeve member through the openings in the sleeve member can thus be adjusted to vary the proportion of air which passes through the sleeve member relative to that proportion which passes along the annular channel 29.

Seeds escaping from the sleeve member between the finger 68 or through the perforations 70 thus are expelled radially outwardly under centrifugal force and engage or impact upon the inside surface of the housing wall 78. These seeds then fall under gravity to the bottom of the housing wall 78 in the area confined outside the sleeve member and forwardly of the front wall 60A of the fan. In this area is provided a transverse discharge auger 85 which transports the seeds outwardly to one side of the housing 78 to a second upwardly extending auger transportation system 86 for transport into the tank.

The duct 32 from the fan connects to a splitter 90 which splits the crop material and air fed through the duct 32 into a plurality of sub ducts 91 which extend from the splitter 92 the spreader nozzles 23. Thus the crop material is transported by the air from the fan to the boom 22 for spreading onto the ground in a substantially smooth or even distribution pattern across the full width of the swath on which the combine harvester is operating.

In one example the rotor has a diameter at its rear edge 40 chosen so that the annular channel has a working circumference at its rear discharge end which is of a length that is significantly greater than the linear working width a conventional cylinder of a conventional combine harvesting system.

In operation, therefore, the crop material is fed into the open front mouth 25 of the intake section and is accelerated rearwardly and outwardly along the conical wall 37 by the helical flights 39 for injection into the annular channel. The material is carried around the stator and axially of the stator by the rotation of the rotor and the threshing action occurs around the full periphery of the annular channel while the material moves rearwardly along the annular channel.

After threshing between the rasp bars of the rotor and the stator, all of the crop material including the seeds and the remaining crop material including the stalks, heads and chaff is discharged from the rearward end of the annular channel. To maintain all of the material inside the annular channel, the stator 27 is imperforate so that no seeds or the crop material escapes outwardly from the stator at this position. Similarly the rotor is imperforate so that all of the material remains within the annular channel and is discharged rearwardly from the discharge end of the annular channel. All of the material thus discharged collects on the inside separating surface 71 of the sleeve member 30. As the sleeve member is supported from the outside, the inside of the sleeve member is wholly free from obstructions which in any way prevent the material from moving rearwardly and inwardly along the sleeve member under the influence of the airflow. The sleeve member is also smooth on the inside so that the material can flow readily under the influence of the air stream across the sleeve member to the fan. The spaces between the fingers allow the seeds to escape outwardly. The elongate perforation 70 allow the seeds to escape through the perforations and these perforations are elongated in the angular direction in view of the fact that the sleeve member is rotating past the seeds until the crop material is accelerated by the sleeve member.

In one example the rotor is an 8 bar threshing system having 8 bars arranged angularly spaced around the rotor. The threshing speed or rotation of the rotor will generally lie in the range 200 to 600 RPM. Selection of the rotor speed is effected by a conventional gear box provided between the engine and the shaft 18. Such a gear box can provide four different threshing speeds to provide thorough threshing efficiency in various crops.

The sleeve member will generally have a range of speed of 300 to 500 RPM and will rotate in the same direction as the rotor but independently of the rotor. This rate of rotation will provide a centrifugal force in the order of 5 to 20 G. This ensures separation efficiency for all crops. The rate of rotation of the sleeve member can be adjusted by the hydraulic motor 77 independently of the drive to the rotor. The amount of airflow into the system can be controlled by the doors 83.

The system of the present invention has a number of advantages:

1. The design provides greater capacity at the threshing cylinder in view of the large diameter of the threshing cylinder or rotor at the rear end.
2. The conventional walkers are eliminated and replaced by separation using high centrifugal force.
3. The clearance between the rotor and the stator is readily adjustable by the axial movement of the rotor.
4. The construction is of mechanically simple nature so that a threshing system has fewer parts.
5. The separation and threshing system uses all rotary motion and is therefore insensitive to slide slopes and hill slopes.
6. The compact nature of the threshing and separation system allows the use of a larger grain bin up to 400 bushels.
7. The threshing and separation system has a higher capacity than a conventional machine of the same size.
8. The threshing and separation system has less working parts providing a lower manufacturing cost.
9. The mounting of all of the elements on a single shaft allows improved servicing and access to main sections on the components for easier cleaning.
10. The centrifugal feeding, threshing and separation systems are self cleaning and maintenance free.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combined threshing and separating apparatus for separating seeds from a seed crop comprising:

a threshing rotor, means mounting the threshing rotor for rotation about a longitudinal axis of the threshing rotor, the threshing rotor having an outer threshing surface surrounding the axis which extends from a feed end in a direction longitudinally of the axis to a discharge end;

first drive means driving rotation of the threshing rotor about the axis of the be threshing rotor;

a threshing stator surrounding the rotor and having an inner surface adjacent the outer threshing surface of the rotor;

the inner and outer surfaces being arranged to define therebetween an annular channel having a feed end of the annular channel at the feed end of the rotor and a discharge end of the annular channel at the discharge end of the rotor; means for feeding the crop material to the feed end of the annular channel, the inner and outer surfaces being shaped to effect a threshing action on the crop material as it passes therebetween;

a separating sleeve member defining an inwardly facing separating surface surrounding said axis with an inlet end and an axially spaced discharge end, means mounting the sleeve member for rotation around the axis, the inlet end of the sleeve member being arranged at the discharge end of the annular channel to receive therefrom onto the separating surface of the sleeve member the crop material after threshing in the annular channel;

the separating surface of the sleeve member having a plurality of separating perforations therein such that seeds from the crop material escape from the separating surface outwardly for collection;

second drive means for driving rotation of the sleeve member about the axis to generate centrifugal forces on the crop material on the separating surface;

and fan means for generating an airflow through the discharge end of the sleeve member for drawing air and crop material entrained by the air through the sleeve member for discharge of the crop material separately from the seeds.

2. The apparatus according to claim 1 wherein the sleeve member is conical so as to converge inwardly toward the axis from the inlet end toward the discharge end thereof.

3. The apparatus according to claim 1 wherein the inlet end of the sleeve member is larger in diameter than the discharge end of the annular channel so as to receive thereon all of the crop material from the annular channel.

4. The apparatus according to claim 1 wherein the mounting means and drive means of the sleeve member are arranged externally of the sleeve member so that the separating surface of the sleeve member is free from obstruction by the mounting means and drive means to the flow of air and crop material therealong toward the discharge end and the fan.

5. The apparatus according to claim 1 wherein the separating surface is smooth so as to be free from obstructions to the flow of air and crop material therealong.

6. The apparatus according to claim 4 wherein the mounting means and the drive means comprises a plurality of support rollers on an outside of the sleeve member at angularly spaced positions therearound for engaging the sleeve member for support of the sleeve member and for driving the sleeve member by frictional engagement therewith.

7. The apparatus according to claim 6 including a cylindrical guide surface on the sleeve member defining a guide channel for receiving the rollers and locating the sleeve member against axial and radial movement.

8. The apparatus according to claim 6 wherein at least one of the support rollers is driven by a hydraulic motor.

9. The apparatus according to claim 1 wherein the fan and the sleeve member are arranged such that at least some of the air drawn through the sleeve member passes through the separating perforations from an outside of the sleeve member to the inside.

10. The apparatus according to claim 9 including a housing surrounding the sleeve member, the housing having openings therein allowing airflow through the housing to the sleeve member, the openings being adjustable for control of a volume of air passing from the housing to the sleeve member.

11. The apparatus according to claim 10 wherein the housing is fixed to the stator.

12. The apparatus according to claim 1 including an inner guide wall mounted inside the sleeve member and attached to the rotor, the inner guide member having a surface generally following a shape of the separating surface so as to define an annular channel between the inner guide member and the separating surface.

13. The apparatus according to claim 1 wherein the separating surface includes a plurality of axially extending fingers at the inlet end with openings between the fingers such that crop material exiting from the annular channel engages onto the fingers at the inlet end of the sleeve member allowing seeds from the crop material to pass between the fingers for collection.

14. The apparatus according to claim 1 wherein the separating perforations are elongated in a direction angularly of the sleeve member.

15. The apparatus according to claim 1 wherein the rotor and stator are conical so that the annular channel increases in diameter from the inlet end to the discharge end thereof.

16. The apparatus according to claim 1 wherein the rotor and stator include axially extending rasping bars thereon.

17. The apparatus according to claim 1 wherein the fan and the rotor are connected for common rotation.

18. The apparatus according to claim 1 including a housing surrounding the fan having a radially extending discharge duct in the housing, the discharge duct being curved so as to extend from an initial radial direction to a subsequent axial direction for communication of the crop material away from the inlet end of the rotor.

19. The apparatus according to claim 1 wherein the stator is imperforate so that all the crop material including the seeds is discharged from the discharge end of the annular channel onto the separating surface of the sleeve member.

20. The apparatus according to claim 1 wherein the drive means for the sleeve member is arranged to drive the sleeve member at a rate of rotation sufficient to generate a centrifugal force on the crop material greater than 5G.

\* \* \* \* \*